Sept. 28, 1926.

J. TEMPERLEY 1,601,007

PLANT FOR MANUFACTURING ROAD MAKING MATERIAL

Filed Oct. 5, 1923   5 Sheets-Sheet 3

Sept. 28, 1926.  1,601,007
J. TEMPERLEY
PLANT FOR MANUFACTURING ROAD MAKING MATERIAL
Filed Oct. 5, 1923   5 Sheets-Sheet 4
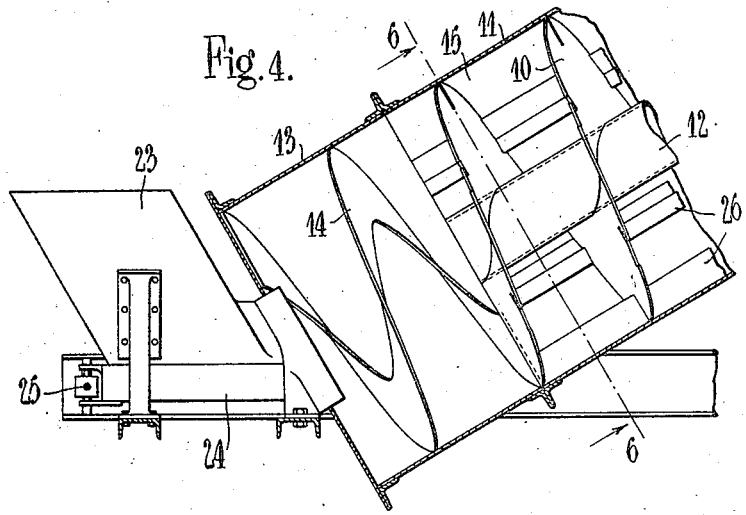
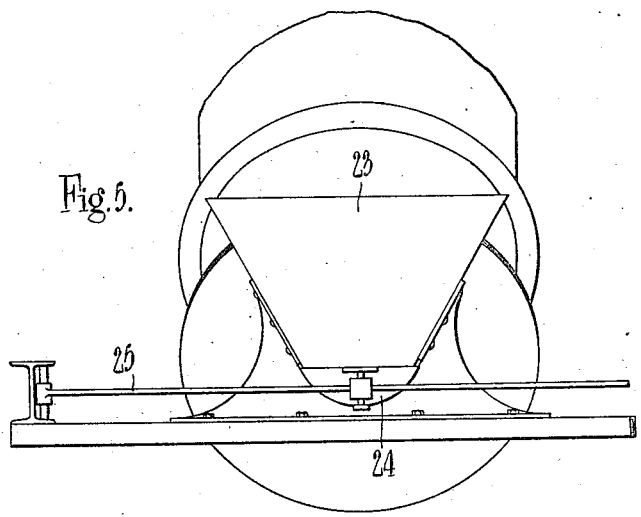
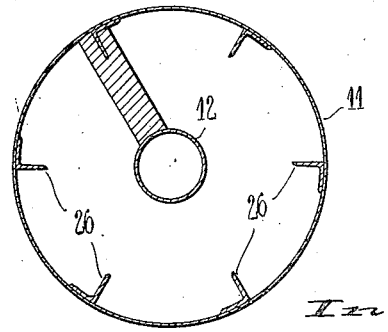
Inventor
J. Temperley
By Marks & Clerk Attys

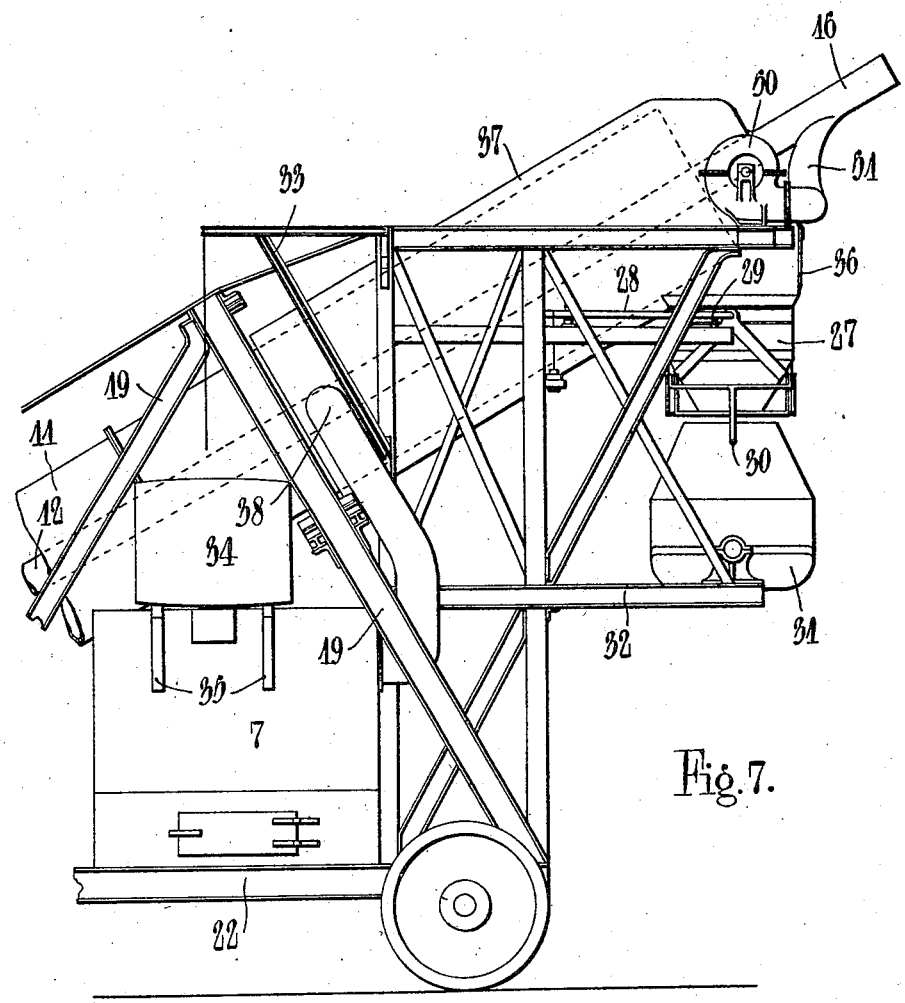

Patented Sept. 28, 1926.

1,601,007

UNITED STATES PATENT OFFICE.

JOSEPH TEMPERLEY, OF LONDON, ENGLAND.

PLANT FOR MANUFACTURING ROAD-MAKING MATERIAL.

Application filed October 5, 1923, Serial No. 666,856, and in Great Britain October 10, 1922.

This invention relates to apparatus for manufacturing tar macadam and like materials.

More particularly the invention relates to machines or apparatus comprising means for drying the macadam or other material, means for weighing a batch of such material, means for heating tar, bitumen or the like and means for mixing the batch with a predetermined amount of said heated tar, bitumen or the like.

In such apparatus it is usually necessary to provide special elevating means to raise the material to a sufficient height to permit one or more of the following processes to be effected, namely, storing, weighing, mixing and delivering of the material to a vehicle or the like.

Thus the plant becomes more or less complicated and expensive as regards manufacture, upkeep and running costs.

An object of the present invention is to simplify the construction of plant for manufacturing tar macadam and like material and to provide a plant which is relatively inexpensive to manufacture and to run.

The present invention comprises a plant for manufacturing tar macadam or the like in which elevating means is provided which raises the macadam or other material to the requisite height, the whole of the drying and heating of the material being effected during its passage through said elevating means.

This elevating dryer may operate within or comprise a flue connected at either end to a furnace, which may be utilized for heating the tar or the like.

The elevating dryer may comprise an Archimedean screw or spiral which may be rigidly fixed within a casing so that both screw and casing rotate.

Means may be provided to effect a cascading or turning-over action of the material within the spiral.

The speed of the elevating dryer may be varied according to the nature of the material to be dried.

The inclination of the elevating dryer may be capable of variation in order to facilitate transportation.

In the accompanying drawings which diagrammatically illustrate, by way of example, an apparatus according to the invention:—

Figure 1 is an elevation of the tar macadam plant,

Figures 2 and 3 being respectively a plan and end elevation corresponding thereto.

Figure 4 is an elevation partly in section of the loading end of the elevating dryer, Figure 5 being an end elevation thereof, while Figure 6 is a section on the line 6—6 of Figure 4.

Figure 7 is an elevation of a modified form of plant.

Figure 1:
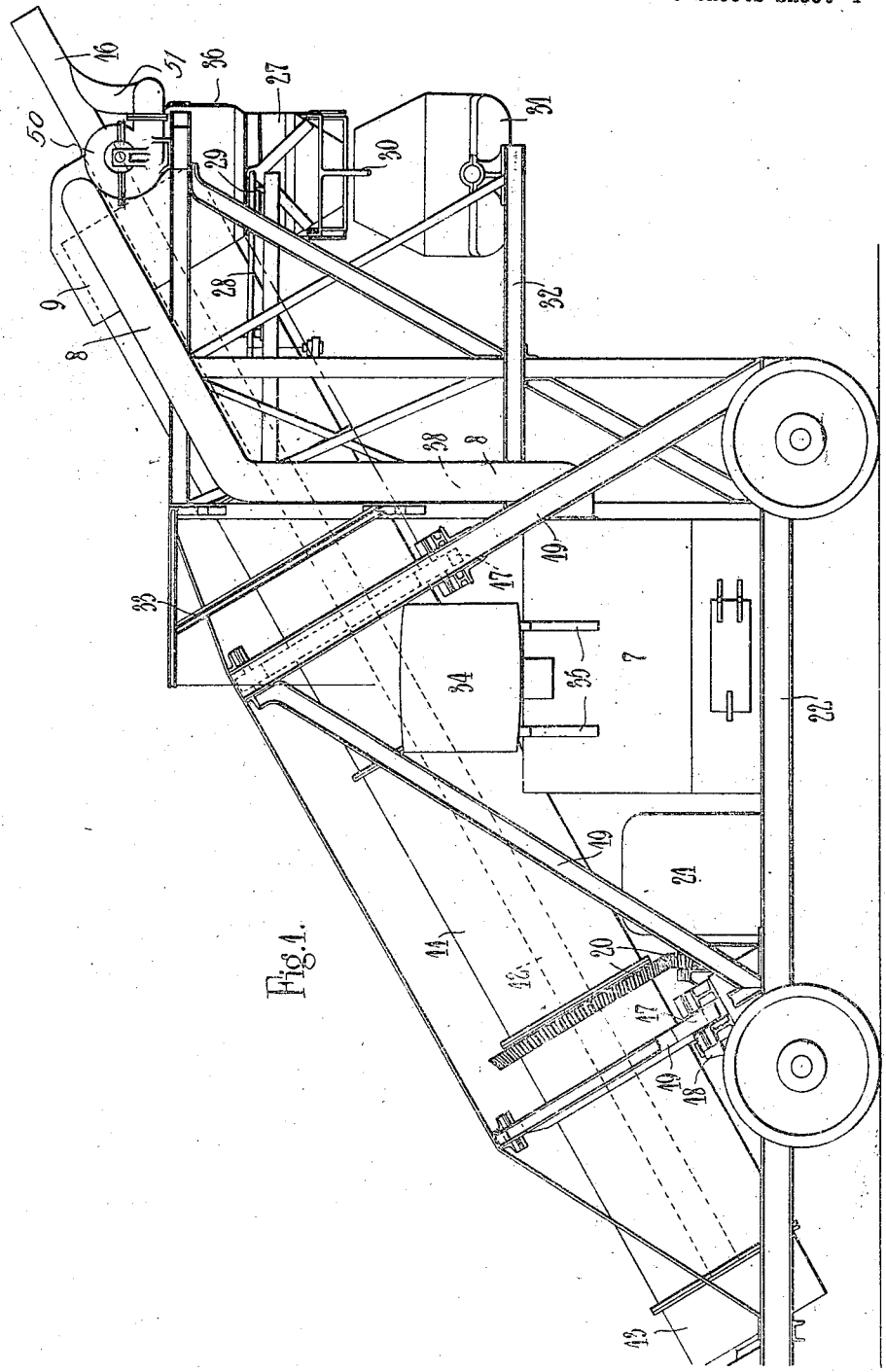
Figure 2:
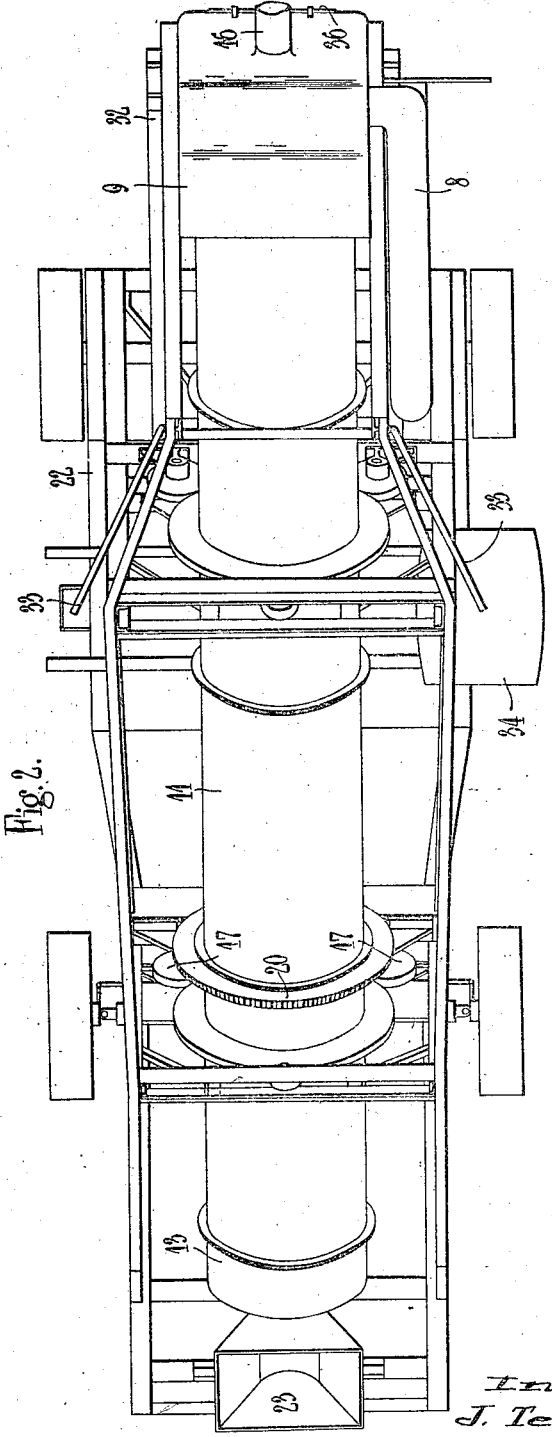
Figure 3:
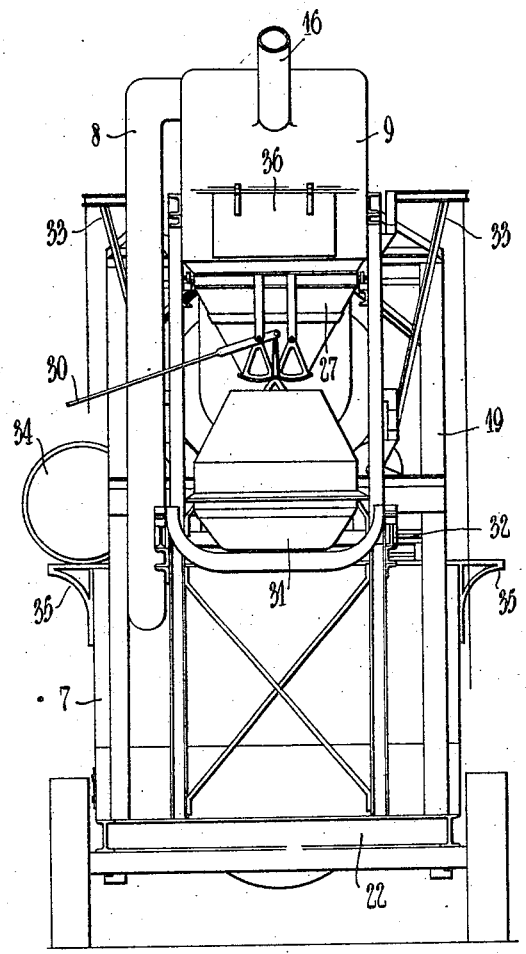

In carrying the invention into effect as illustrated in the drawings the plant comprises a furnace 7 adapted to heat a tank containing tar, bitumen or the like, the combustion gases passing from the furnace by the flue 8 to a casing 9 into which the upper end of the elevating dryer projects.

The furnace may operate with solid or liquid fuel as desired.

The elevating dryer comprises an Archimedean screw or spiral 10 which is rigidly fixed within the casing 11 which is mounted so as to rotate as hereinafter described. Mounted axially within the casing and occupying the space within the spiral is a hollow cylindrical member 12 which forms an uptake flue.

The elevating dryer is conveniently formed in sections comprising a cylindrical casing and a portion of the screw, an uptake flue, which sections are flanged at the ends and bolted together.

The lowest or feeding section 13 is provided with a spiral 14 which is open at the centre and the depth of the spiral is also less than the spiral 10 whereby it is impossible to feed more material into the spiral 10 than the latter can take.

The combustion gases pass from the casing 9 downwardly into the spiral space 15 until they reach the feeding section 13 when they pass upwardly through the flue 12 and out of the chimney 16.

If desired, means, such as a fan 50 connected to the chimney 16 by the pipe 51, may be provided for creating the necessary draught or suction through the elevating dryer.

The elevating dryer is mounted in an inclined position upon rollers 17 in the well-known manner, the downward thrust being taken by the conical roller 18 with which the collar 19 contacts. The rollers 17 and 18 are carried in suitable bearings mounted upon the braced frame 19. Rotation of the elevating dryer is effected by means of the bevel gearing 20 operated by the engine 21 mounted upon the wheeled carriage 22.

The material to be dried, such as macadam, sand or the like, is fed into the feeding section 13 from the hopper 23 (see Figures 4 and 5) the lower part 24 of which is adapted to be reciprocated by means of the pivoted bar 25 which is connected to suitable devices for the purpose which devices may be driven from the engine 21.

In passing through the elevating dryer the material is cascaded by the longitudinal vanes 26 mounted within the casing.

The dried and heated material is delivered into the weighing hopper 27 which is carried by a weighted beam 28 mounted upon the knife edge 29. Normally the weighing hopper is held up against the casing 9 until the desired amount has been weighed, thus providing a tight joint between the hopper and casing. When the desired amount has been weighed it is released by the lever 30 and falls into the mixer 31 to which the requisite amount of tar, bitumen or the like, has been delivered by any suitable known means.

The mixer 31 is mounted upon the channel member 32 at such height that the batch of mixed material may be delivered in a vehicle as desired.

In order to prevent jamming of the material in the elevating dryer should the weighed batch be not removed or from any other cause, the casing 9 is provided with a hinged door 36 that automatically opens should the jam occur.

Hoists 33 are provided for lifting the barrel 34 containing the bitumen or the like onto the brackets 35 whereby it may be preliminarily heated and delivered to the bitumen tank.

The mixer 31 and the fan 50 may be driven from the engine 21 through any suitable gearing.

According to a further modification the casing may be lengthened to enclose the upper part of the elevating dryer which extends beyond the top bearing as indicated by the reference 37 (Figure 7), in which case the flue will open into the casing at the lower end as indicated at 38. With the casing 37 arranged in this manner an increased heating of the elevating dryer will result, as the combustion gases will first pass upwardly in the space between the casing 37 and the casing 11 and then downwardly through the spiral chamber and finally upwardly through the flue 12.

The speed of travel or rotation of the elevating dryer may be varied by the insertion of a suitable speed gear so that the time of passage of the material through the elevating dryer may be controlled whereby the requisite drying and heating of the material is effected.

Instead of delivering the material to a weighing or measuring hopper, it may be delivered to a storage bin for use as desired or directly to a mixing machine.

The apparatus may be portable or not as desired.

Although the elevating dryer has been described as a screw elevating dryer, it is obvious that other forms of elevator may be provided.

Having now described my invention what I claim as new and desire to secure by Letters Patent is:—

1. A plant for use in manufacturing road making material comprising a furnace having a flue, a casing containing a spiral conveyor and having its axis inclined to the horizontal, a hopper at the upper end of said casing means for rotating the casing to cause material to be fed through the casing and into the hopper, and means connecting the flue with the upper end of the casing to permit the combustion products from the furnace to pass downwardly through the casing in contact with said material.

2. A plant for use in manufacturing road making materials comprising a furnace having a flue, a casing containing a spiral conveyor mounted upon a central longitudinal tube, said casing having its axis inclined to the horizontal, a hopper at the upper end of said casing means for rotating the casing to cause material to be fed through the casing into the hopper, and means connecting the flue with the upper end of the casing to permit the combustion products from the furnace to pass downwardly through the casing in contact with said material, and thence upwardly through the central tube.

3. A plant for use in manufacturing road making material comprising a furnace having a flue, a casing containing a main spiral conveyor and having its axis inclined to the horizontal, an auxiliary spiral conveyor within the casing and adapted to feed material to the main conveyor, the pitch of the auxiliary conveyor being such that overloading of the main conveyor is impossible under normal conditions, a hopper at the upper end of said casing means for rotating the casing to cause material to be fed through the casing and into the hopper, and means connecting the flue with the upper end of the casing to permit the combustion products from the furnace to pass downwardly through the casing in contact with said material.

4. A plant for use in manufacturing road making materials as claimed in claim 1 wherein means are provided to feed material to the lower end of the conveyor.

5. A plant as claimed in claim 1 wherein the means connecting the flue with the upper end of the casing comprises a stationary casing extending downwardly over said upper end the flue being connected at the lower end of said stationary casing.

In testimony whereof I have signed my name to this specification.

JOSEPH TEMPERLEY.